March 16, 1943. J. B. DYER 2,313,928
DOMESTIC APPLIANCE
Filed April 24, 1939 8 Sheets-Sheet 1

INVENTOR.
BY John B Dyer
ATTORNEYS

March 16, 1943. J. B. DYER 2,313,928
DOMESTIC APPLIANCE
Filed April 24, 1939 8 Sheets-Sheet 2

INVENTOR.
BY John B Dyer
Spencer Hardman and John
ATTORNEYS

March 16, 1943. J. B. DYER 2,313,928
DOMESTIC APPLIANCE
Filed April 24, 1939 8 Sheets-Sheet 3

INVENTOR.
BY John B. Dyer
Spencer Hardman and John
ATTORNEYS

March 16, 1943. J. B. DYER 2,313,928
DOMESTIC APPLIANCE
Filed April 24, 1939 8 Sheets-Sheet 4

INVENTOR.
John B Dyer
BY Spencer Hardman and Fehr
ATTORNEYS

March 16, 1943.  J. B. DYER  2,313,928
DOMESTIC APPLIANCE
Filed April 24, 1939  8 Sheets-Sheet 5

INVENTOR.
John B. Dyer
BY Spencer Hardman and John
ATTORNEYS

March 16, 1943. J. B. DYER 2,313,928
DOMESTIC APPLIANCE
Filed April 24, 1939 8 Sheets-Sheet 8
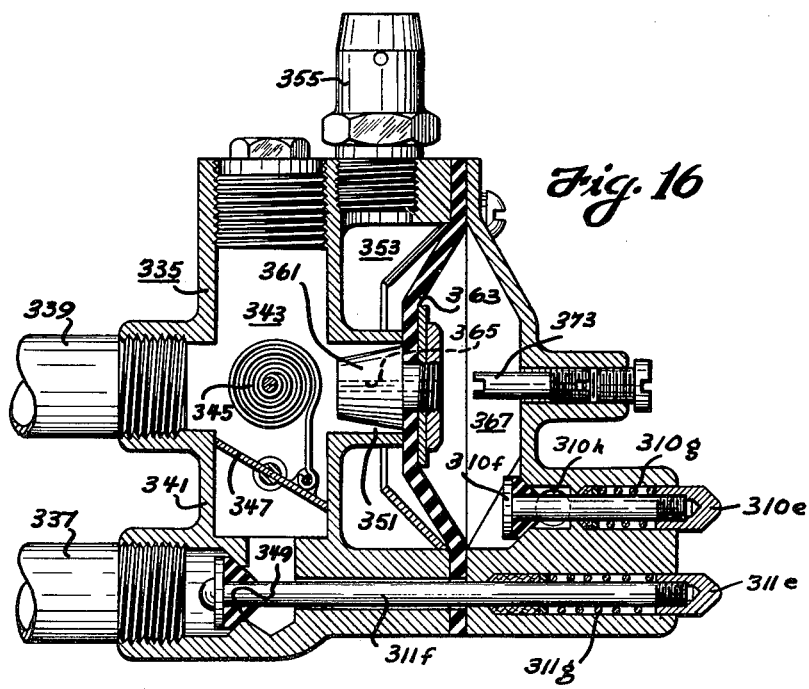
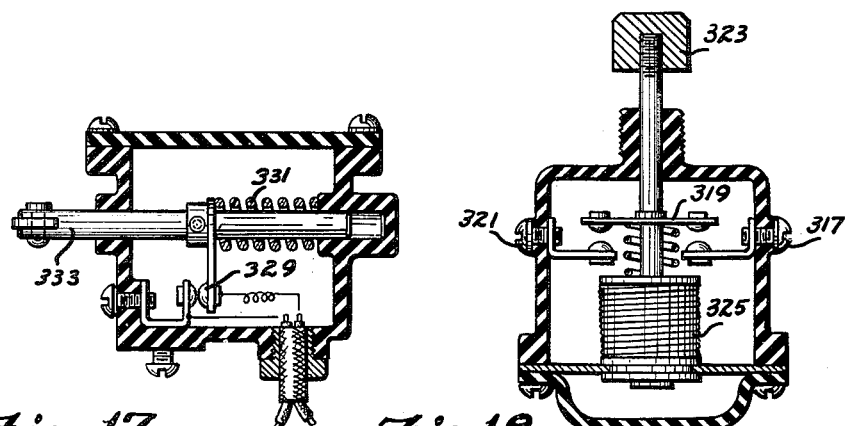

Patented Mar. 16, 1943

2,313,928

UNITED STATES PATENT OFFICE 2,313,928

DOMESTIC APPLIANCE

John B. Dyer, Dayton, Ohio, assignor to General Motors Corporation, Dayton, Ohio, a corporation of Delaware Application April 24, 1939, Serial No. 269,594

6 Claims. (Cl. 68—23)

This invention relates to a domestic appliance and more particularly to automatic washing machines and centrifugal rinsing and drying machines.

The natural progress of the art dictates an automatic washing machine. From a practical standpoint, simplicity of design and operation dictates a single receptacle type of washing machine. Previous attempts to provide such a type of washing machine developed structures which had bad vibration characteristics under certain conditions causing a lack of durability and reliability as well as other customer objections.

It is an object of my invention to provide an improved durable and reliable washing machine of the single receptacle type which is simple in design, neat in appearance, and balanced so as to avoid excessive vibrations under any reasonable conditions.

My improved washer employs a centrifugal rinsing and drying mechanism. I have found that such mechanism in disposing of the water in the manner heretofore performed tends to leave suds on the clothes and fails to remove sand and dirt from the receptacle.

It is an object of my invention to so remove water from the centrifugal rinsing and drying mechanism as to prevent contact between the suds and the clothes in removing water from the receptacle and especially to prevent the deposit of the suds on the clothes.

It is another object of my invention to remove by the water withdrawn from the receptacle, sand, dirt and other particles which tend to remain in suspension in the water.

Further objects and advantages of the present invention will be apparent from the following description, reference being had to the accompanying drawings, wherein a preferred form of the present invention is clearly shown.

In the drawings:

Fig. 16 is a sectional view of the water metering and water tempering valve shown at the right in Fig. 1;

Fig. 17 is a sectional view of the switch mechanism actuated by the cam in Fig. 9; and Fig. 18 is a sectional view of the solenoid and manually controlled switch shown diagrammatically in Fig. 9 and shown in elevation in Fig. 14.

Briefly, I have shown an automatic washer which consecutively supplies hot water, agitates, supplies rinsing water, rinses and dries the clothes and finally shuts off automatically. The washer is provided with a balanced tub and floating driving and supporting mechanism. The agitator within the tub is reciprocated vertically by a Scotch yoke drive which is located beneath the tub and drives the agitator through a shaft in axial alignment with the tub. The rinsing and drying of the clothes is performed by spinning the tub through a driving mechanism which is coaxial with the agitator drive and the axis of the tub. The tub is provided with central outlets so that the suds will not be deposited upon the clothes upon removal of the water. The operation of the washer is controlled by cams driven by a step by step timing mechanism which in turn is driven by the main driving motor which also furnishes the drive through clutches for the agitating mechanism and the spinning of the tub.

Outer shell

Figure 1:
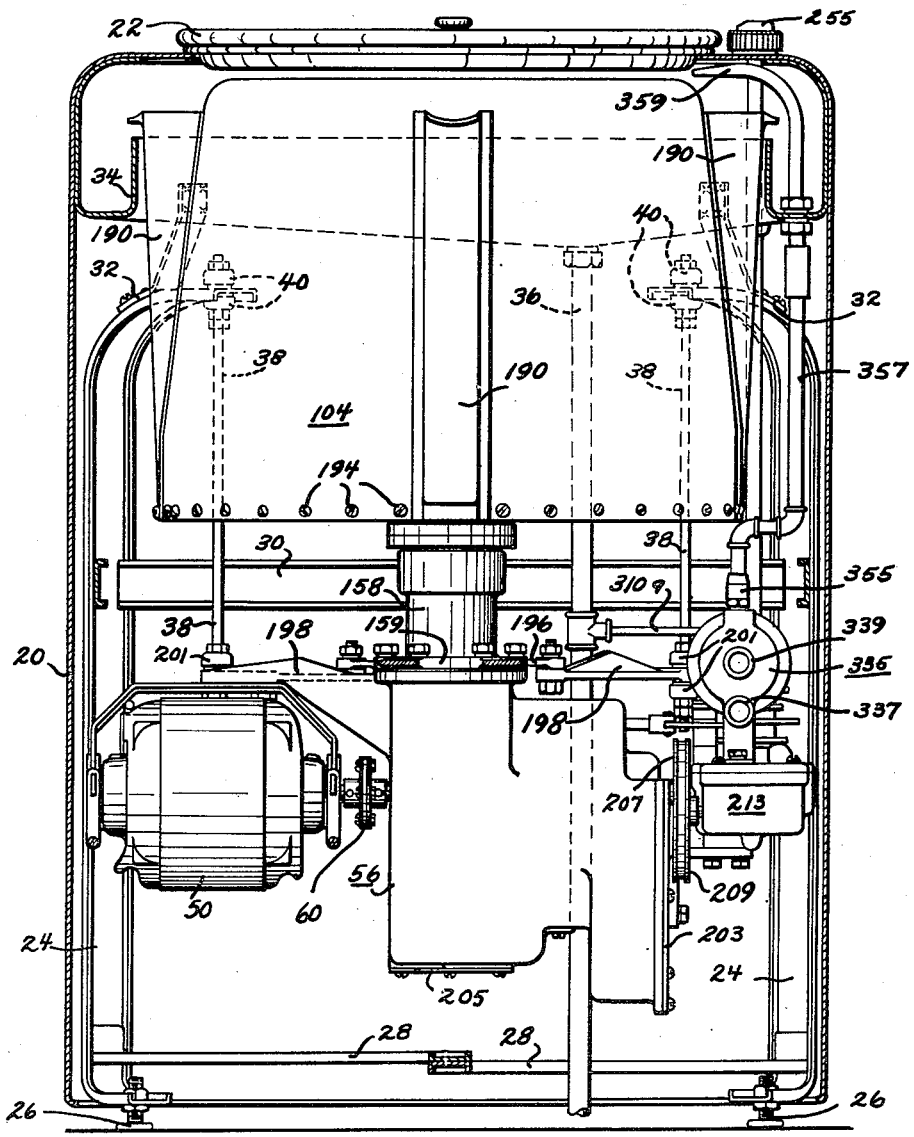
Fig. 1 is a view in elevation with the casing in section of one form of an automatic washing machine embodying my invention.

Referring now to the drawings, there is shown in Fig. 1 an outer sheet metal shell 20, closed at the top by a lid 22, provided with four vertical inner frame members 24, having adjustable gliders 26 at their lower ends. These vertical frame members 24 are held in positon at their lower ends by diagonal frame members 28 and at their mid-portion by arc-shaped frame members 30 which follow the contour of the outer shell 20. The upper ends of the frame members 24 are provided with brackets 32 which support a collecting trough 34 formed on the inside of the in-turned flange at the top of the outer shell 20. The collecting trough 34 is provided with a drain which includes the downwardly extending pipe 36 which connects to the sewer or other form of waste water disposal. The frame members 24 at their upper ends are bent inwardly to support the upper ends of floating supporting rods 38 for supporting of the moving parts of the washing machine. These rods are provided with thick, soft rubber vibration absorbing washers 40 on either side of the in-turned upper ends of the frame members 24. These washers are held in position by nuts threaded onto the upper ends of the rods 38.

*Driving mechanism*

Figure 2:
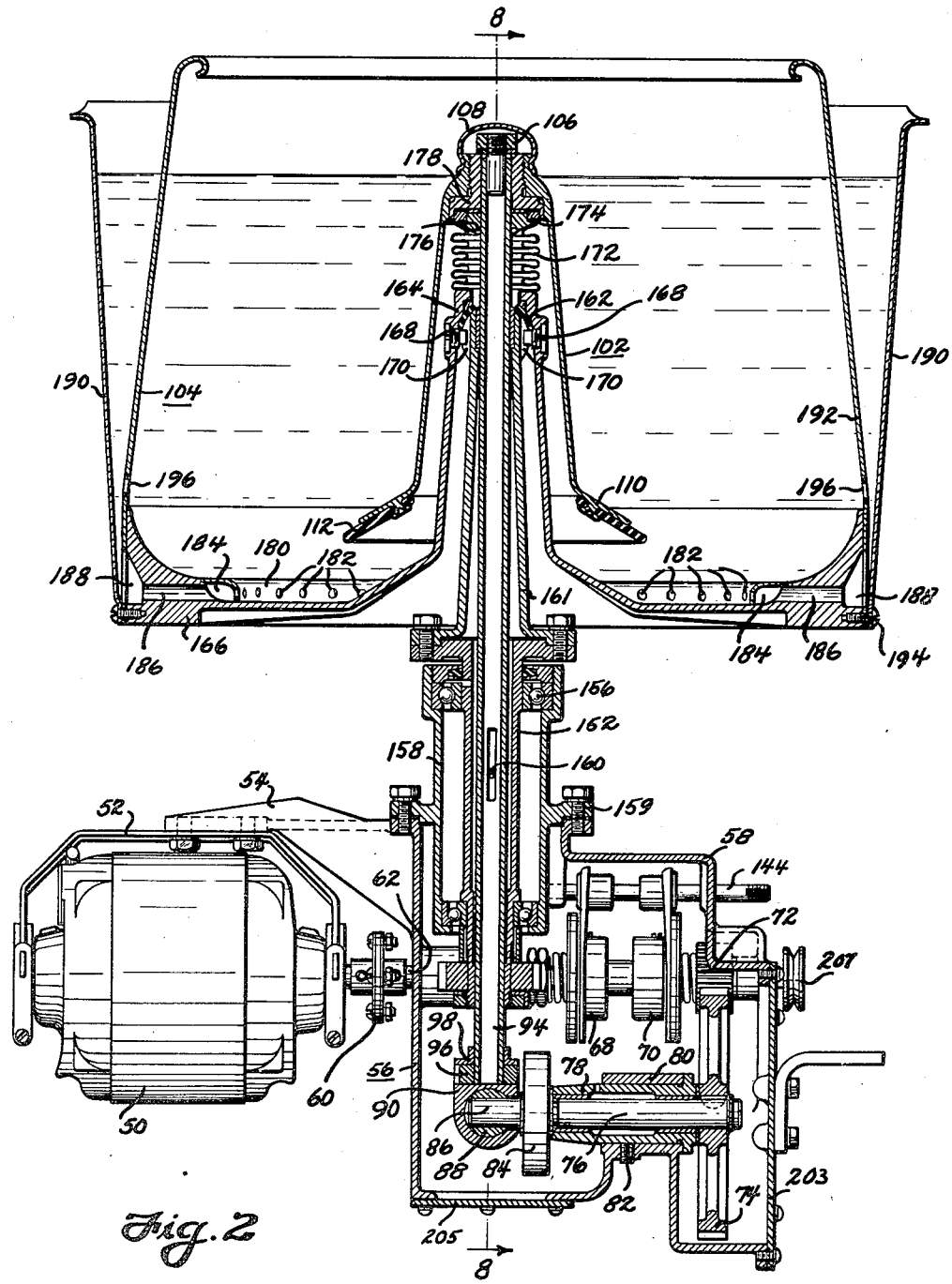
Fig. 2 is a vertical sectional view of the mechanism shown in Fig. 1.
Figure 7:
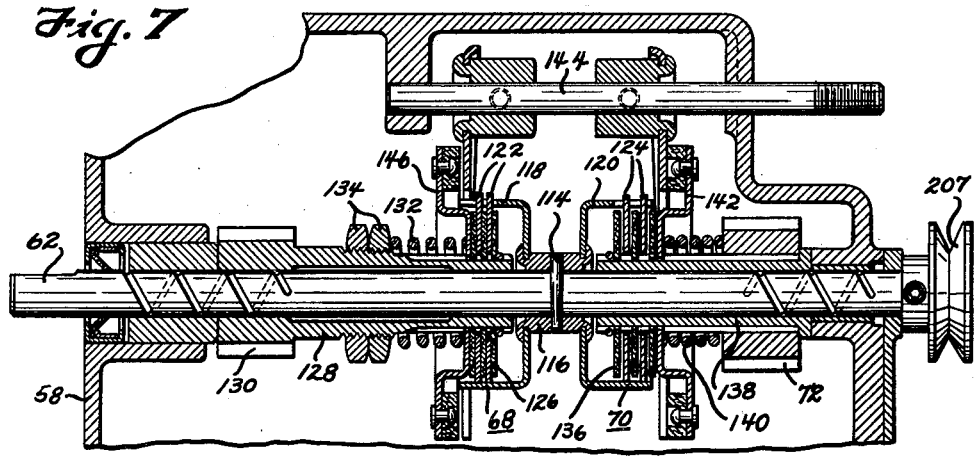
Fig. 7 is an enlarged sectional view of the clutch mechanism shown in Fig. 2.
Figure 8:
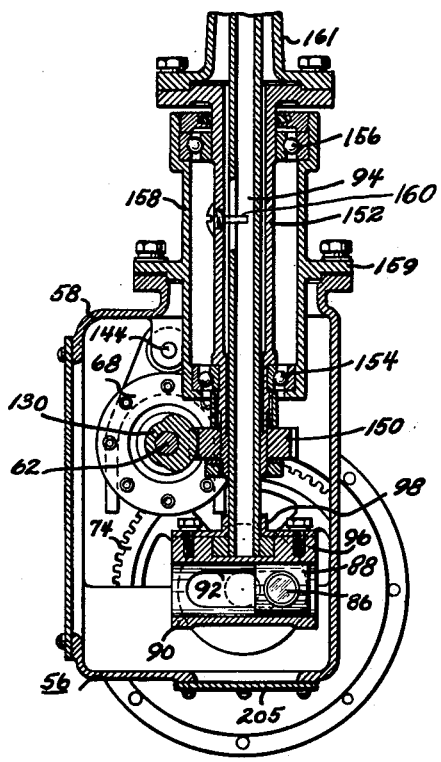
Fig. 8 is a sectional view of a portion of the spinning and agitating mechanism taken along the line 8—8 of Fig. 2.

The main moving parts of the washer are better shown in Figs. 2, 7 and 8, and include the main driving motor 50 which is supported by rubber mountings at either end. These mountings are provided upon the lower ends of an inverted U-shaped bracket member 52 which in turn is fastened to the arm 54 of a main casting 56 which includes a portion forming a crankcase 58. The main driving motor 50 has its shaft connected by a flexible coupling 60 to a clutch shaft 62 supported by the bearings 64 and 66 which are provided in opposite sides of the crankcase 58.

*The agitator drive mechanism*

The clutch shaft 62 (Fig. 7) is provided with a spinning clutch 68 for spinning the tub and a clutch 70 which connects the clutch shaft 62 to a pinion 72 which in turn drives a larger gear 74 keyed to one end of the shaft 76. The shaft 76 is rotatably mounted in a double bearing sleeve 78 which in turn is fixed within a bearing support 80 and held in position by a set screw 82. The sleeve 78 is provided with a shoulder at the end nearest the gear 74 which engages the adjacent end of the bearing support 80 in order to properly locate the sleeve 78.

The shaft 76 at the end opposite the gear 74 is provided with a heavy metal disc 84 having a crankpin 86 which extends into the piston shaped slide member 88 of a Scotch yoke drive mechanism. The slide member 88 is received within a cylindrical member 90 formed with a slot 92 for receiving the crankpin 86. This cylindrical member 90 is connected to the lower end of agitator shaft 94. The crankcase 58 is provided with a cover plate 203 by which the sleeve 78 may be withdrawn from the bearing support 80 after loosening the set screw 82 in order to remove drive pin 86 from the Scotch yoke drive. This will allow access to the agitator rod 94 which is made possible by the closure plate 205.

In order to permit the agitator shaft 94 to rotate, it is provided with a bearing member 96 at its lower end which is rotatively mounted in a recess provided in the top of the cylindrical member 90 by a flanged plate 98. The member 96 may be welded or otherwise fastened to the bottom of the agitator shaft 94 and is free to rotate within the recess beneath the flanged opening of the plate 98. The agitator shaft 94 extends vertically upwardly and its upper end is connected to a cone-shaped agitator 102 which is located within the tub 104. The agitator shaft 94 is hollow and is provided at its upper end with a stud upon which is threaded a clamping nut 106 for clamping the agitator hub 178 to the top of the shaft 94. The agitator 102 is threaded onto its hub 178 and has a sheet metal cap 108 providing a smooth crown for the top of the agitator 102 which covers the clamping nut 106. The agitator is somewhat in the form of a thimble and has a metal flange 110 at its lower end to which is riveted a heavy rubber flange 112.

When the driving motor 50 operates and the clutch 70 is engaged, the pinion 72 will drive the gear 74 to revolve the crankpin 86 of the Scotch yoke drive mechanism for reciprocating the agitator shaft 94 at the rate of several hundred times a minute. This agitation provides excellent washing of the clothes in the tub 104. The clothes have very little contact with the agitator or the sides and bottom of the tub so that the clothes are subjected to little wear and tear during the washing operation. For the washing operation the tub is filled to a level about the bottom of the cap 108. The construction of the clutch mechanism is better shown in Fig. 7.

*The clutches*

The clutches 68 and 70 are connected to the clutch shaft 62 by a tapered pin 114 which connects the sleeve 116 to the clutch shaft 62. Riveted to each end of the sleeve 116 are the cup-shaped driving members 118 and 120 which slidingly support the notched multiple disc driving plates 122 and 124 of the spinning and agitating clutches 68 and 70. The driven plates of the spinning clutch 68 are designated by the reference character 126 and are provided with teethed apertures receiving the splined sleeve 128 which is rotatably mounted upon the clutch 62 and is provided with the spinning helical gear 130 for spinning the tub.

When the spinning clutch is engaged as shown in Fig. 7, the driving and driven plates 122 and 126 are held together by a spring 132 which imposes a limited amount of tension upon the clutch plates so as to permit a slipping of the clutch at the start of the spinning operation in order to prevent too great a strain upon the driving mechanism or driving motor. This spring 132 is adjusted by the adjusting and lock nuts 134 which are threaded onto the sleeve 128. The agitating clutch 70 is also provided with driven clutch plates 136 provided with teeth engaging the splined end of the sleeve 138 which carries the agitator pinion 72. The sleeve 128 is provided with a flange for holding the agitator pinion 72 in place and the clutch spring 140 extends between the agitator pinion 72 and the clutch throw-out member 142 which is adapted to retract the spring 140 from the clutch plates 124 and 136 of the agitator clutch 70.

When the clutch throw-out member 142 so retracts the spring 140, the clutch 70 is disengaged. The clutch throw-out member 142 is fastened to and supported by the clutch operating rod 144 which also carries the clutch throw-out member 146 located between the clutch spring 132 and the clutch plates 122 and 126 of the spinning clutch 68. When the clutch rod 144 is moved to the right, as shown in Fig. 7, the clutch throw-out member 142 retracts the clutch spring 140 to disengage the agitator clutch 70 and the agitator drive from the clutch shaft 62. In this position, however, the spinning clutch spring 132 is permitted to exert its limited tension upon the clutch plates of the spinning clutch 68 so that the helical gear 130 which spins the tub is connected through the clutch plates to the clutch shaft 62.

The spinning mechanism

The helical gear 130 meshes at right angles with a helical gear 150 mounted upon the lower end of a sleeve 152 which surrounds the agitator shaft 94. This sleeve 152 is supported by ball bearings 154 and 156 which in turn are supported by a cylindrical-shaped member 158 provided with a flange 159, by which it is fastened to the main casting 58.

The sleeve 152 is connected to the agitator rod 94 by a pin 160 which extends through a slot in the agitator rod 94 so as to permit the agitator rod 94 to reciprocate independently of the sleeve 152 and to cause the rod 94 to rotate with the sleeve 152. The upper end of the sleeve 152 is provided with a flange to which is bolted a flanged tapered member 161 which extends upwardly into a recess formed in the bottom of the tub and is provided with a ball-shaped upper end portion. Resting on this ball-shaped upper end portion is a ball-shaped hard rubber washer 162 upon which rests a socket portion 164 of the bottom casting 166 of the tub 104. This socket portion 164 is provided with a pair of screws 168 which have projections formed on their ends entering into slots 170 provided in the ball-shaped portion at the upper end of the member 160. The projecting portions of the screws 168 provide the driving engagement between the member 160 and the bottom 166 of the tub 104. The screws 168 also hold the hard rubber washer 162 in the socket 164 of the bottom 166 of the tub 104.

In order to seal the upper end of the member 161 as well as the agitator shaft 94 there is provided a bellows type seal member 172 of properly compounded rubber or some other rubber-like material such as "Duprene" or "Neoprene." The lower end of the seal member 172 is provided with a heavy ring which is held between the hard rubber member 162 and the flange of the socket portion 164. The upper end of the seal member 172 is also provided with a ring portion 174 which is clamped between a metal ring 176 which fits tightly upon a reduced portion of the agitator shaft 94 and an agitator mounting member 178 which also fits upon the reduced upper end portion of the agitator shaft 94 and is held in place by the nut 106. The agitator 102 together with its cap 108 form an assembly which is threaded onto the member 178 after the assembly of the washing machine. The bottom 166 of the tub 104 is formed of a heavy cast metal, such as cast iron, zinc or brass and has a conical upwardly extending portion which surrounds the member 160 and is located within the confines of the agitator so that the ball and socket connection may be placed at the proper point so as to provide an inherent static balance of the tub in order that the spinning of the tub may be started without serious vibration. The bottom of the tub is weighted around the rim in such a fashion that no matter how an ordinary quantity of clothes is distributed within the tub, the tub will assume a position so as to compensate for any unbalance.

Water and suds disposal

I have found in most forms of devices of this type that when clothes are dried by spinning, the suds are deposited upon the clothes and thus a thorough rinsing is not accomplished. I have found by constructing and draining the tub in the manner disclosed herein that this deposit of suds may be avoided. My method of accomplishing this is to cause the removal of the water from the central portion of the tub while the tub is being spun. I find that under such conditions the clothes remain against the outer side of the tub while the water bearing the suds remains and is drawn from the central portion of the tub, since the suds are lighter than the water or the clothes. For doing this I provide an angular insert 180 in the bottom of the tub which is provided with a number of comparatively large holes arranged in a circle about midway between the rim and the center of the tub and provide the major outlet from the tub. These holes, designated by the reference character 182, may be of any suitable number and size such as 24 three-eighths inch holes.

Beneath the insert 180 there is provided a passage 184 through which water flows to four sets of passages 186 which extend through the edge of the bottom 166 and connect to a recess 188 formed at the bottom of each of the four vertical risers 190 which are fastened upon the outside of the sheet metal side wall 192 of the tub 104 at four evenly spaced positions. The side wall 192 and the riser 190 are fastened to the bottom 166 of the tub by the screws 194 and this joint is sealed by a suitable gasket. The side walls 192 are tapered inwardly as they extend upwardly from the top of the bottom member 166. This taper is preferably at an angle of from 7 to 10 degrees. A few small holes 196 are provided through the side walls 192 at the bottom of the tapered portion and located at four different portions of the wall so that they communicate directly with the passage provided by each of the risers 190. These holes are quite small and have a much smaller capacity than the holes 182 and 185. These smaller holes are provided for removing the small portion of the water which cannot readily be removed through the outlets 182 after the major portion of the water has been removed.

The water is drawn through the outlets 182 and 186 and up the risers 190 by centrifugal force since the risers 190 are tapered outwardly and have a spout which overhangs the collecting trough 34. These passages form a centrifugal pump which rapidly expels the water from the tub into the trough from which it flows down through the pipe 36 to the drain. This method of removing water also provides an excellent means for removing the sand and dirt which does not remain in suspension in the water but which collects in the bottom of the tub adjacent the holes 182. The rapid movement of the water from the tub out through the holes 182 carries the sand and dirt with it and so cleans the bottom of the tub. Instead of the four risers 190, the metal may continue around the tub 104 to form a single tub shaped riser.

Floating support

The flange 160 is provided with arms 196 which are connected to links 198 which in turn connect to the lower ends of the supporting rods 38 provided with rubber mountings 201 above and below the links 198. This provides a floating mounting for the tub and its driving mechanism so that during the spinning operation the entire mass can rotate about its center of gravity with considerable freedom.

*Automatic control mechanism*

Figure 4:
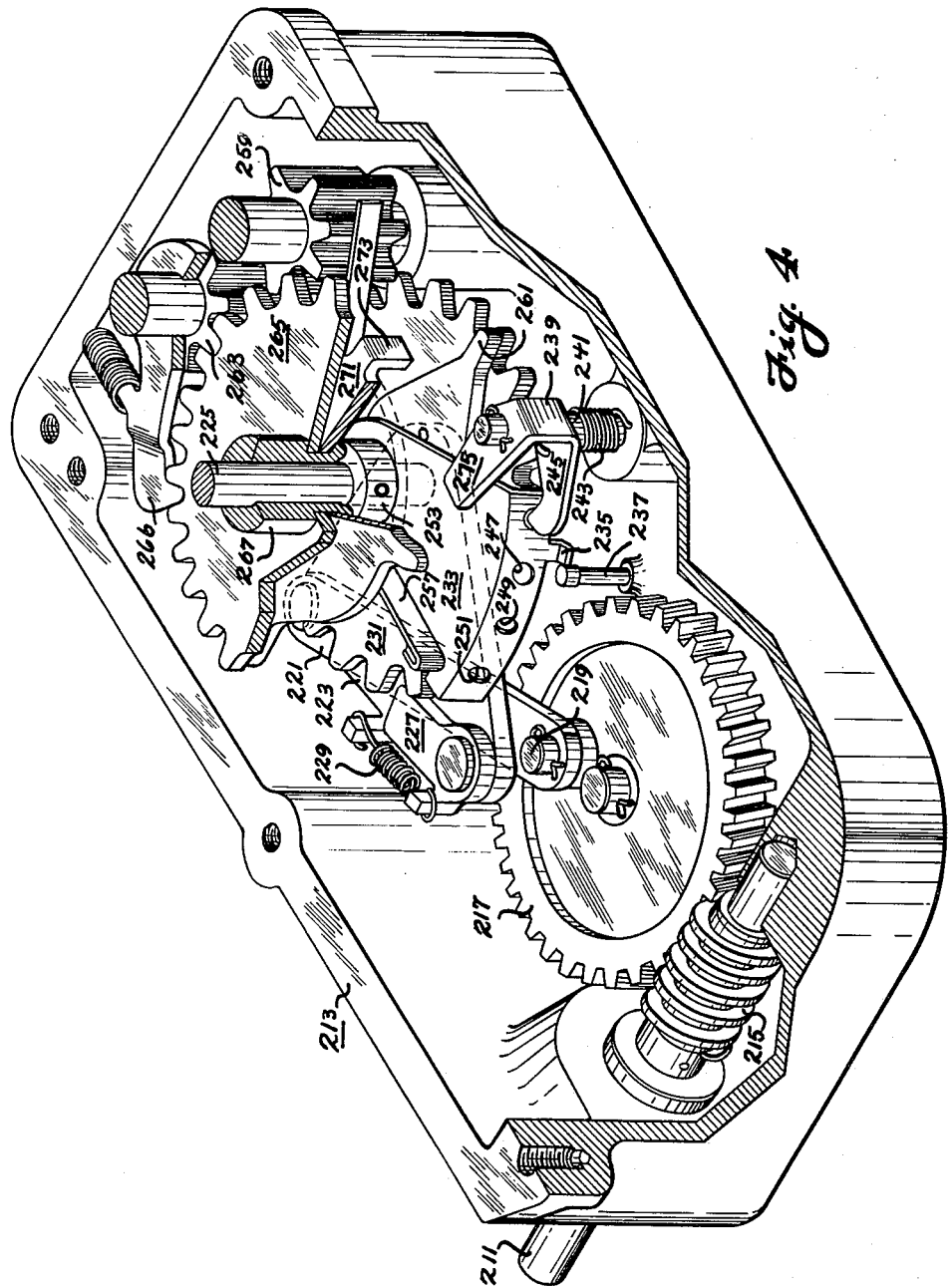
Fig. 4 is an isometric view of the gear case shown in Fig. 3.
Figure 5:
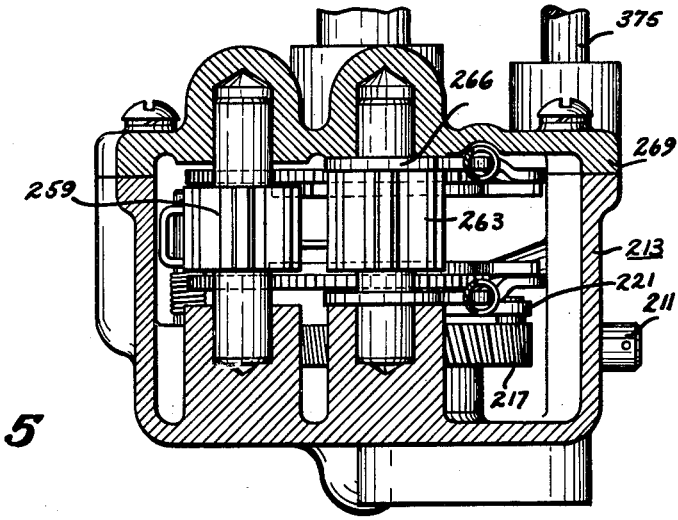
Fig. 5 is a sectional view of the far end of the gear case shown in Fig. 4.

The operation of the washer is controlled by a cam mechanism which is driven from the clutch shaft 62 by a pulley 207 mounted upon the outer end of the clutch shaft 62. This drive pulley 207 through a belt, drives a large pulley 209 which is mounted upon the outer end of a worm shaft 211 extending from the gear case 213, best shown in Fig. 4. This gear case includes the mechanism for driving five cams, which control the water metering valve, the cold water valve, the agitation mechanism, the spinning mechanism and the stopping of the washer. The worm shaft 211 is provided with a worm 215 whithin the gear case 213 which drives a worm gear 217 which in turn is provided with a drive pin 219 connecting the worm gear 217 to a link 221. The link 221 is pivotally connected to a triangular plate 223 pivotally mounted upon the shaft 225 and is located beneath all the gearing and plates shown on the shaft 225. This triangular plate 223 is provided with a pawl 227 which rests upon its upper surface, and through a spring 229 is held in engagement with the teeth of a gear 231 located directly on top of the triangular plate 223.

The rotation of the worm gear 217 causes the link 221 to reciprocate the triangular-shaped member 223 to cause the pawl 227 to engage the teeth of the gear 231 to advance it one or more teeth during each oscillation. The number of teeth which is picked up and advanced by the pawl 227 is controlled by a fan-shaped member 233 which is pivoted upon shaft 225 and has a downwardly turned flange covering the teeth of the gear 231. When the fan shaped member 233 is in the position shown in Fig. 4 the pawl 227 will ride over the turned down flange of this fan-shaped member 233 and thus the number of teeth picked up by the pawl 227 during each oscillation is controlled. When the fan-shaped member 233 is in the position shown in Fig. 4 it will limit the pawl 227 to advancing one tooth for each oscillation.

It should be noted that this fan-shaped member 233 is provided with a projection 235 which engages a pin 237 to limit the movement of the fan-shaped member 233 in a clockwise direction. When the fan-shaped member is moved in a counter-clockwise direction from the stop pin 237, it permits the pawl 227 to pick more than one tooth per oscillation. In order to hold the fan-shaped member 233 in other positions, there is provided a latch means including a double arm member 239 pivoted upon a pin 241 and provided with a torsion coil spring 243 which holds the lower arm 245 with its pointed end portion in one of the holes provided in the flange of the fan-shaped member 233.

As shown, the arm 245 is in the hole limiting the pawl to the picking of one tooth per oscillation. A second hole 247 is provided which, when notched with the arm 245, permits the pawl to pick two teeth per oscillation; a third hole 249 is provided which, when notched with the arm 245, permits the pawl 227 to pick three teeth per oscillation. Finally a fourth hole 251 is provided which, when notched with the arm 245, permits the pawl 227 to pick four teeth per oscillation.

This fan-shaped member 233 is formed integrally with the collar 253 which is fastened by a pin to the shaft 225. This shaft 225 with the fan-shaped member 233 is adapted to be rotated by an inner knob 255 provided upon the top of the washer and is provided with a shaft which connects to the upper end of the shaft 225 by a tongue and slot connection. Through this inner knob 255, shown in Figs. 1 and 14, the speed at which the cams are driven is controlled. The fan-shaped member 233 is urged with its projection 235 against the stop pin 237 by a flat spring 257 which engages at its outer end a turned-up projection from the fan-shaped member 233. This flat spring 257 continues around the far side of the collar 253 and then extends into engagement with the teeth of a pinion 259 and thereby serves as a spring detent for the pinion 259 so as to prevent too free a rotation of this pinion.

The gear 231 is not in mesh with any gear but between it and the fan-shaped member 233 it carries a one tooth gear 261 having a single tooth which is adapted to mesh once each revolution of the gear 231 with the pinion 263. The pinion 263 meshes with the upper gear 265 fastened to a sleeve 267 surrounding the shaft 225. This sleeve 267 like the shaft 225 projects upwardly through the lid 269 of the gear case 213 and has fastened thereon the cams 309, 310, 311, 312 and 313 which correspond in order to the cams shown in Figs. 9 to 13. Thus this mechanism provides for a slow rotation of the cams which is varied in speed by the position of the knob 255, the shaft 225 and the fan-shaped member 233 which determines the number of teeth picked at each oscillation by the pawl 227.

However, it is only desired to provide this variation in speed during the first washing or agitating period and in order to accommodate this I provide means for returning the fan-shaped member 233 to the slow speed position at the end of the first agitating period. In order to do this a three tooth gear 271 is fastened to the sleeve 267 along with and directly beneath the gear 265. This three tooth gear 271 has a downwardly turned projection 273 which is adapted to engage the upper arm 275 of the two arm member 239 so as to lift the pointed end of the lower arm 245 out of any one of the notches in the flange of the fan-shaped member 233 which will allow the fan-shaped member 233 to turn in a clockwise direction under the influence of the flat spring 257 to move the projection 235 against the stop pin 237. This will insure the remaining portion of the washing operation to be controlled by the cams operating at the slow speed.

*The electrical circuit*

Figures 9, 10, 11, 12, 13, 14, 15:
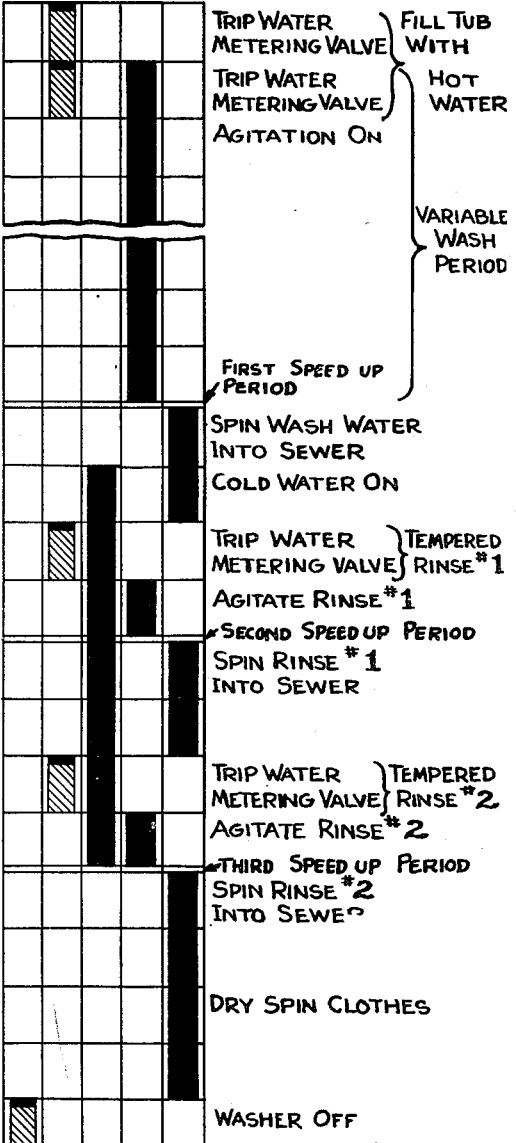
Fig. 9 shows the stop cam together with the switch mechanism which it controls and the wiring diagram of the washing machine.
Fig. 10 is a view of the cam for the water metering valve.
Fig. 11 is a view of the cold water control cam.
Fig. 12 is a view of the agitation control cam.
Fig. 13 is a view of the spinning control cam.
Fig. 14 shows the control knobs and shafts as well as the solenoid control for starting and stopping the machine, and for controlling and setting the variable wash period.
Fig. 15 is a diagram illustrating the actuating periods of the various cams.

Referring now to Figs. 9 to 15, and more particularly to Fig. 9, there is shown a wiring diagram which includes the driving motor 50 connected to the supply conductor 315 and by a conductor 317 to an electromagnetic and manual switch 319 which in turn connects to the other supply conductor 321. The electromagnetic switch 319 has a manual operating button 323 and a solenoid holding means 325. A coil spring, located between the solenoid 325 and the switch contact bar 319, normally keeps the switch 319 in an open position. When the switch 319 is in the open position the solenoid 325 is deenergized, since it is connected in series with the switch 319. However, when the button 323 is depressed the contacts 319 close the circuit not only to the driving motor 50 but also to the solenoid 325, which thereafter holds the contacts 319 in closed position as long as it is energized. The solenoid 325 is connected by conductor 327 to a switch 329 which is normally closed by a compression type coil spring 331. The switch 329 is formed as a part of a cam follower 333 which is acted upon by the cam 309 when the sleeve 267 has made one complete revolution, and thus has completed all the advance necessary for a complete washing. When the cam 319 engages the follower 333 the switch 329 is opened to deenergize the solenoid 325 to cause the solenoid 325 to release the switch contacts 319 to open both the motor and the solenoid circuit thus completely deenergizing the washer.

*The water control*

The cam 310 controls the admission of water into the tub. This cam 310 is provided with projections 310a, 310b, 310c and 310d. These projections are adapted to engage a valve stem head 310e provided upon the end of the valve stem of a control valve 310f provided in the water metering valve mechanism generally designated by the reference character 335. This water metering valve 335 includes a cold water inlet pipe 337, the hot water inlet pipe 339, a valve casing 341 providing a mixing chamber 343. This mixing chamber 343 includes a bi-metal thermostat 345 which operates a butterfly valve 347. This valve 347 controls the flow of water which passes through the cold water valve 349 from the cold water inlet pipe 337. When the cold water valve 349 is kept closed, only hot water will be supplied to the washer even though the butterfly valve 347 opens under the influence of the bi-metal 345.

The mixing chamber 343 is connected by a valve opening 351 with a discharge chamber 353 connecting to the outlet connection 355 of the metering valve 335. As shown in Fig. 1, this valve outlet connection 355 is connected by piping 357 to a nozzle 359 extending over the rim of the tub 104 in order to discharge water into the tub. The valve control passage 351 of the metering valve 335 is adapted to be closed by a cone-shaped valve member 361 which is fastened to a diaphragm 363 of properly compounded rubber or other rubber-like material such as "Duprene" or "Neoprene."

Figure 3:
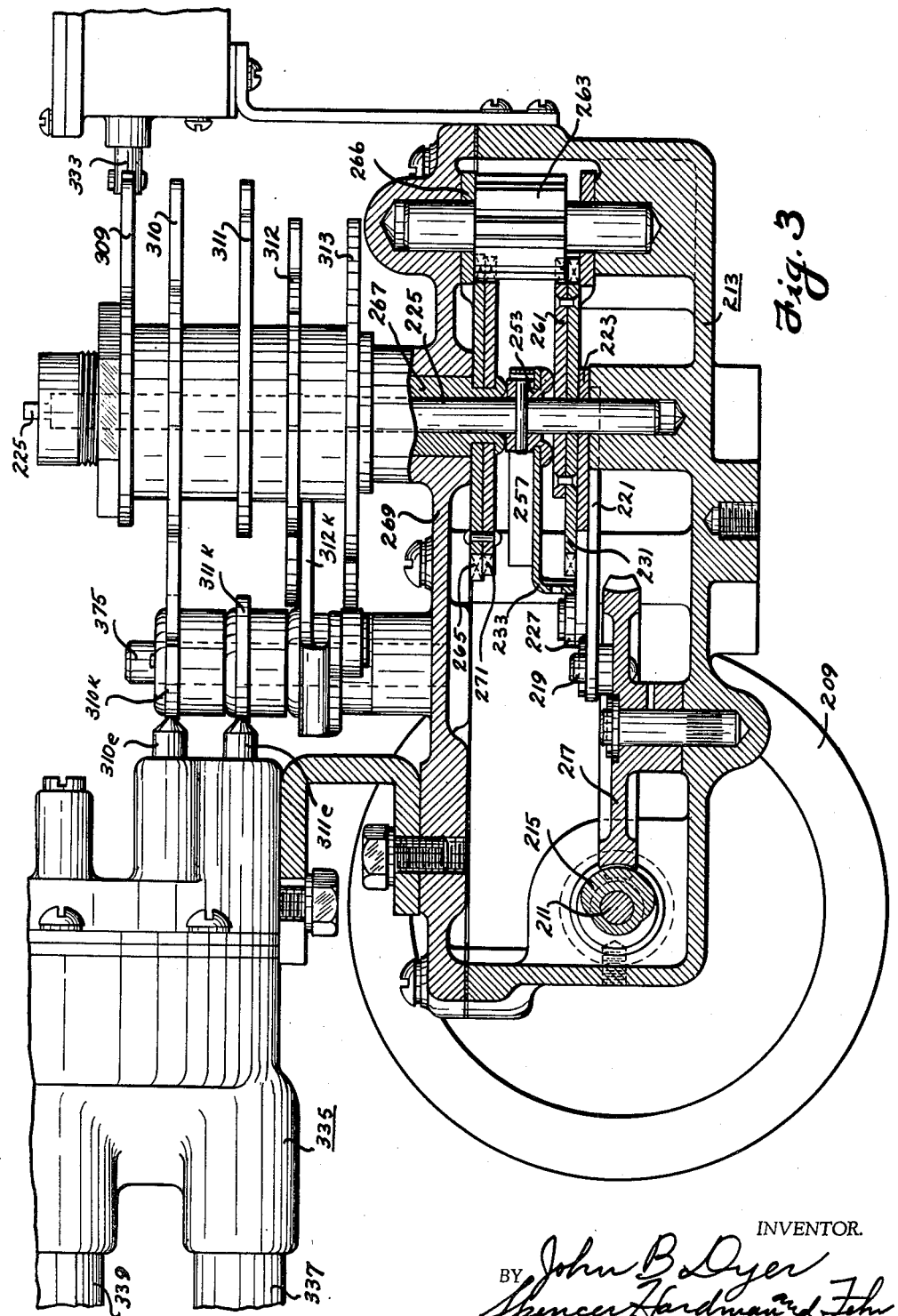
Fig. 3 is a view partly in elevation and partly in section of the control mechanism shown on the right side of Fig. 1.
Figure 6:
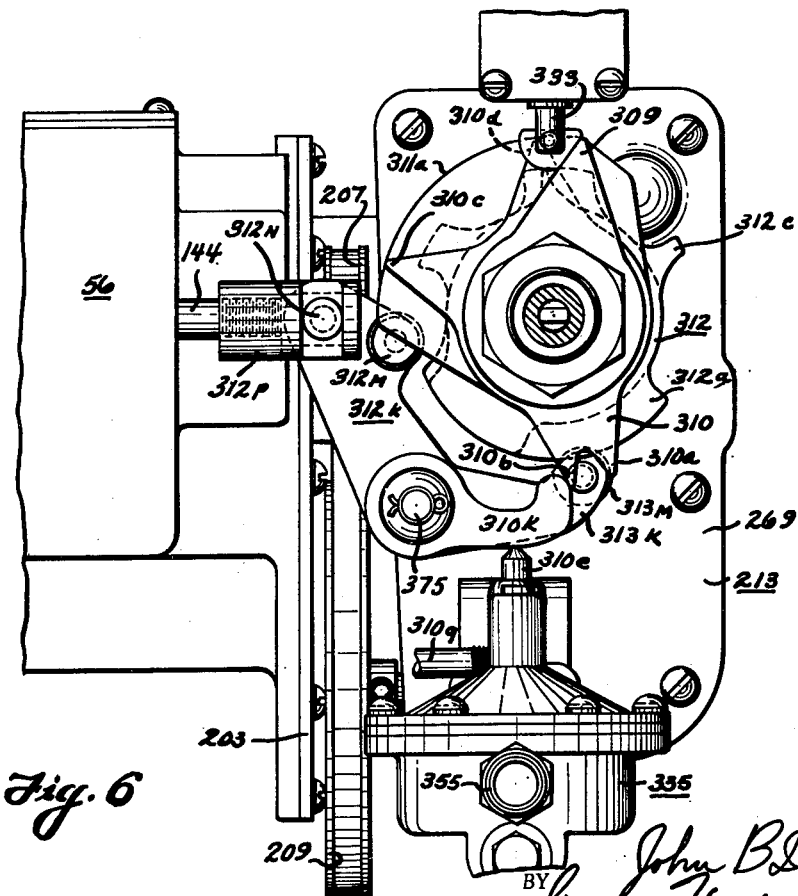
Fig. 6 is a top view of the control mechanism shown in Fig. 3.

The valve member 361 is provided with a restricted passage 365 extending to the other side of the diaphragm 363. The control valve 310f opens into the diaphragm chamber 367. When the valve 310f is kept closed by its valve spring 310g the water will flow through the passage 365 into the diaphragm chamber 367 and will permit the diaphragm 363 to be moved into engagement with the flanged valve seat opening to prevent the flow of water to the tub 104. However, to start the washing period the cam projection 310b (see Figs. 3 and 6) first comes into engagement with the follower 310k which acts upon the head 310e to open the valve 310f and to permit the water to be discharged from the diaphragm chamber 367 through the open valve 310f to the outlet 310h and the pipe 310q to the drain pipe 36. This permits the diaphragm 363 to be moved under the pressure of the water in the mixing chamber 343 to a position against the adjustable stop 373. This operation allows a measured quantity of water to flow through the valve opening 371 into the discharge chamber 353 to the tub. The quantity of water flowing through the valve is governed by the size of the passage 365 which controls the amount of water which will flow into the diaphragm chamber 367. The diaphragm chamber 367 must be filled by the water flowing through the passage 365, before the valve opening 351 can be closed.

The tripping of the valve 310f by the cam 310 is indicated in the second column in Fig. 15. The black part indicates the tripping which is performed by the cam projection 310a and the shaded part indicates the time that the water flows through the valve. At the end of this first interval of time the agitation begins as shown in the fourth column and at the same time the second cam projection 310b briefly engages and opens the valve 310f to allow another charge of water indicated by a black and a shaded portion in the second column. Both charges are of hot water since the cold water valve 349 has not been opened.

The cam 311 engages a cam follower 311k which pivots on the pin 375 to engage the valve head 311e which is threaded upon the end of the valve stem 311f of the cold water valve 349. This is shown in the third column of Fig. 15. The valve head 311e holds a compression type coil spring 311g which normally holds the cold water valve 349 in closed position.

*The agitation and spinning control*

The agitator cam 312 has a long cam projectoin 312a providing the first agitation period shown in the fourth column of the chart Fig. 15. This cam 312 operates upon the arm 312k provided with a roller follower 312m which engages the cam face of the cam 312. This arm 312k is provided with a pin 312n which engages a slot in a connecting member 312p threaded onto the outer end of a clutch control shaft 144. When the high part of the cam 312a engages the roller follower 312m the clutch control shaft 144 is pushed inwardly causing an engagement of the agitator clutch 70 to cause the agitator 102 to be reciprocated vertically by the pinion 72, the gear 74 and the Scotch yoke construction at the bottom of the agitator shaft 94. This will continue as long as the roller follower engages the high part of 312a of the agitator cam 312. The spinning cam 313 operates against roller follower 313m provided upon the end of the arm 313k which is formed as a part of a double arm with the arm 312k, both of which move in unison about the pivot pin 375. Thus it is necessary that the cam follower 313 be upon a low portion of its cam 313 when the roller follower 312m is upon the high portion of its cam and vice versa.

*The speed-up mechanism*

I have found with an ordinary constant speed drive for the cams that there is too long an interval between agitation and the spinning operation. Therefore in order to reduce this interval I have provided a special speed-up mechanism for speeding up the rotation of the gear 265 and the sleeve 267 as well as the cams at the time it is desired to change from agitation to spinning. This is the purpose of the three teeth provided upon the three tooth gear 271. The teeth of this three tooth gear 271 are so located that at the end of each agitation period one of these teeth will come into mesh with the pinion 259 and when the single tooth of the single tooth gear 261 meshes with the pinion 259 it will provide an additional movement of one or more teeth for the gear 265 which rotates with the three tooth gear 271. Thus this mechanism constitutes a speed-up for the cams at the three periods determined by the location of the three teeth. In order to prevent too great amount of rotation of the cams during this speed-up period I have provided a spring detent 266 for the gear 265 which engages the teeth of the gear 265 to prevent excessive movement but this detent will not prevent ordinary movement of the gear 265 by either the single tooth gear 261 or the three tooth gear 271.

The spinning mechanism

When the roller follower 313m engages the high portion 313a of its cam it pulls the clutch control shaft 144 outwardly through the medium of the arm 312k, the pin 312n and the connecting member 312p in order to cause the release of the agitator clutch 370 and the engagement of the spinning clutch 68. The tension of the clutch spring of the spinning clutch 68 is such that it will allow considerable slippage before the helical gear 130 will begin to turn and rotate the helical gear 150 and the tub 104. This will prevent too great a strain upon the motor and the mechanism which rotates the tub 104. The universal type of suspension for the tub 104 will prevent vibration during the accelerating period and after the tub gets up to speed the floating support provided by the rods 38 will allow the mechanism to rotate about its center of gravity and thereby will prevent destructive vibration. The spinning or rotation of the tub will then cause the flow of water out of the tub through the holes 182 and the risers 190 into the collecting trough 34 and the drain pipe 36. Thus in this way, after the clothes have been agitated or washed, this wash water is removed from the tub by this spinning operation.

The rinsing and drying operations

While the spinning operation is still in progress, the cold water cam 311 will have its high portion 311a come into contact with its cam follower 311k and this cam follower 311k will depress the cold water valve head 311c and will cause water to flow into the mixing chamber 343 of the valve 335 under the control of the thermostat 345 and the butterfly valve 347 as shown in the third column of Fig. 15. No water, however, will flow into the tub until the cam projection 310c will operate the cam follower 310k to depress the valve head 310e of the control valve 310f to cause a measured amount of water to flow into the tub as indicated in the second column of Fig. 15. At this time the roller follower 313m leaves the high portion 313a of the spinning cam 313 thus stopping the spinning of the tub. Thereafter a measured amount of water flows into the tub and then cam projection 312b will engage the roller follower 313m to cause the engagement of the agitator clutch 70 in order to provide an agitating rinsing period as shown in the fourth column of Fig. 15.

Following this agitating period the second tooth of the three tooth gear 271 will provide the second speed-up period and thereafter the cam projection 313b will operate to cause the engagement of the spinning clutch 69 to spin the first rinse water into the drain. Following this, the cam projection 310d will trip the water metering valve 310f to permit another measured amount of water to flow into the tub and after this interval of time the cam projection 312c will cause the engagement of the agitating clutch 272 to cause an agitating period.

Following this third agitating period, which is measured by the length of the projection 312c, the agitator clutch 70 will be released and the third tooth upon the three tooth gear 271 will provide the third speed-up period. This will cause the cam projection 313c to cause the engagement of the spinning clutch 69 to provide the long spinning period indicated in the fifth column of Fig. 15 which will spin the second rinse water into the sewer and will completely dry the clothes by prolonging the spinning. When the roller follower 313m reaches the end of the cam projection 313c, the cam 309 will have its projection 309a operate the follower 333 to open the switch contacts 329 thereby deenergizing the solenoid and allowing the opening of the contacts 319.

While the form of embodiment of the invention as herein described, constitutes a preferred form, it is to be understood that other forms might be adopted, all coming within the scope of the claims which follow.

What is claimed is as follows:

1. A washing machine including a receptacle, a centrally located supporting means extending upwardly from beneath the receptacle, means for inherently balancing said receptacle including a universal type connection between said supporting means and said receptacle, said connection having its pivot point above the lower half of said receptacle, an agitator within said receptacle, means for operating said agitator including connecting means extending within said supporting means and connecting to said agitator, and means for rotating said supporting means and said receptacle.

2. A washing machine including a receptacle, a centrally located supporting means extending upwardly from beneath the receptacle, means for inherently balancing said receptacle including a universal type connection between said supporting means and said receptacle, said connection having its pivot point above the lower half of said receptacle, an agitator within said receptacle, means for operating said agitator including connecting means extending within said supporting means and connecting to said agitator, and means including locking means for simultaneously rotating said supporting means, said receptacle and said agitator.

3. A washing machine including a receptacle, a centrally located supporting means extending upwardly from beneath the receptacle, means for inherently balancing said receptacle including a universal type connection between said supporting means and said receptacle, said connection having its pivot point above the lower half of said receptacle, an agitator within said receptacle, means for operating said agitator including connecting means extending within said supporting means and connecting to said agitator, said operating means including means for reciprocating said agitator in a vertical direction, and means for rotating said receptacle.

4. A washing machine including a receptacle, a rotatable sleeve below said receptacle, a universal type connection between said receptacle and sleeve centrally located in said receptacle, a vertically reciprocable rod inside said sleeve and universal type connection and extending into said basket, independent driving means below said receptacle for said sleeve and rod and a vertically reciprocable tubular agitator in said receptacle secured to said rod and spaced around said universal type connection.

5. A washing machine including a receptacle, a rotatable sleeve below said receptacle, a universal type connection between said receptacle and sleeve, a vertically reciprocable rod inside said sleeve and universal type connection and extending into said basket, means to cause said rod to rotate with said sleeve, and a tubular vertically reciprocable agitator in said receptacle secured to said rod and horizontally surrounding said universal type connection.

6. A washing machine including a receptacle having an upstanding central hub, a rotatable sleeve below said receptacle extending into said hub, a universal type connection between said receptacle and sleeve near the top of said hub, a vertically reciprocable rod inside said sleeve and universal type connection and extending into said basket, a vertically reciprocable tubular agitator in said receptacle secured to said rod, and surrounding said hub and spaced sufficiently therefrom to permit said tub to tilt on said universal type connection.

JOHN B. DYER.